United States Patent [19]

Wang

[11] 3,761,035

[45] Sept. 25, 1973

[54] TAPE TRANSPORT ARRANGEMENTS

[75] Inventor: Ben C. Wang, Los Angeles, Calif.

[73] Assignee: Wang Computer Products, Inc., Santa Monica, Calif.

[22] Filed: Aug. 4, 1969

[21] Appl. No.: 847,238

[52] U.S. Cl. ........... 242/182, 242/75.51, 242/75.52, 242/186, 242/187, 242/190, 242/193, 242/195

[51] Int. Cl.. G11b 15/58, G11b 15/30, G11b 15/54

[58] Field of Search .................... 242/186, 188, 189, 242/187, 196, 193, 182, 183, 184, 185, 206, 207, 208, 209, 210, 201, 202, 203, 204, 75.51, 75.52, 45; 226/95, 97; 318/6, 7, 310, 311, 326, 329

[56] References Cited

UNITED STATES PATENTS

| | | | |
|---|---|---|---|
| 3,672,600 | 6/1972 | Carlson et al. | 242/186 |
| 3,587,798 | 6/1971 | Schuman | 242/75.51 UX |
| 3,102,699 | 9/1963 | Proctor | 242/187 |
| 3,587,798 | 6/1971 | Schuman | 242/45 X |
| 3,109,604 | 11/1963 | Brenner | 242/75.52 X |
| 3,127,120 | 3/1964 | Selsted et al. | 226/97 X |
| 3,297,266 | 1/1967 | Rumple | 242/186 |
| 3,323,737 | 6/1967 | Elsbach | 242/184 |
| 3,329,364 | 7/1967 | Brettell | 242/184 |
| 3,334,831 | 8/1967 | Bradt | 242/208 X |
| 3,393,878 | 7/1968 | Aweida et al. | 242/182 |
| 3,454,960 | 7/1969 | Lohrenz | 242/184 |
| 3,488,696 | 1/1970 | Klang | 242/75.51 X |

*Primary Examiner*—George F. Mautz
*Attorney*—Henry M. Bissell

[57] ABSTRACT

Capstanless tape drive arrangements which employ various mechanical configurations and electrical circuitry to keep tape start-stop times and tape speeds substantially constant within selected ranges. These include the use of suitable tape loop buffering arrangements, a tape speed sensor with particular tape speed control servomechanism circuitry, and a pack sense transducer to provide an input signal to the motor control circuit to compensate for variations in pack radius. Also included are tape drive mechanism which admit of automatic threading of the tape through the drive path.

24 Claims, 10 Drawing Figures

PATENTED SEP 25 1973

3,761,035

INVENTOR.
BEN C. WANG

BY Henry M. Bissell

ATTORNEY

TAPE TRANSPORT ARRANGEMENTS

BACKGROUND OF THE INVENTION

I. Field of the Invention

This invention relates to tape drive systems, and more particularly to such systems which provide a digital tape transport without the use of a drive capstan. Arrangements in accordance with the invention include precise control of the tape speed and start-stop times despite significant variations in the radius of the tape on the drive reel, which is the take-up reel in the preferred configuration.

II. Description of the Prior Art

The type of tape transport which has been employed in the data processing field has generally utilized one or more drive capstans and rollers to transport the tape past the magnetic transducer heads between the respective supply and take-up reels. More recently the trend has been to utilize a capstan about which the tape is directed with a substantial wrap-around angle to improve the start-stop characteristics and other operating characteristics of the transport.

Tape transports are known which operate without the use of a drive capstan. The cheapest of the generally available tape recorder and play-back units, as well as certain office dictating machines, utilize a magnetic tape drive system in which the take-up reel is driven at a fixed rotational velocity in order to transfer the tape past the transducer heads. Generally in these devices the rotational velocity of the take-up reel is held substantially constant with the result that the tape speed increases as the tape pack builds up with increasing radius on the take-up reel. Such an arrangement is only acceptable where the tape is both recorded and played back on the same or a like transport.

Other tape transport units drive the tape without resort to a drive capstan and may include particular arrangements for controlling the speed of the tape. One such arrangement is disclosed in U. S. Pat. No. 3,297,266 issued in the name of Wilburn L. Rumple. However, the transport unit of the cited patent is of the analog type which is not concerned with control of start-stop times and distances as is absolutely required with digital tape transports. When one considers the limited inter-record gaps of digital computer tape and the stringent requirements placed upon the control of the start-stop times and distances of digital tape transports, both as to the precision required and the short times and distances that are permissible, and the difficulty of maintaining such precision within allowable limits on the start-stop times and distances through reliance on a drive reel which undergoes significant changes in effective torque lever arm and inertia as the tape pack varies in extent thereon, it will perhaps be understood why the designers of digital tape transport systems have generally preferred the approach of employing a capstan drive.

SUMMARY OF THE INVENTION

It is therefore a general object of the invention to provide an improved tape transport arrangement for digital tape use.

It is a further object of the invention to provide a digital tape transport system which is compact, simple in layout, effective in operation and low in cost relative to other tape transports of the digital tape type.

In brief, particular arrangements in accordance with the present invention dispense with the use of a drive capstan, utilizing the take-up reel in one instance as the tape driving element, and compensate for the inherent disadvantages of such a system relative to precise control of tape speed and start-stop times by circuitry responsive to various tape sensing elements such that the tape speed and start-stop times and distances are maintained substantially constant not only over the extent of the tape being run through the transport from reel to reel, but also over the operating life of the equipment. However, the tape driving element need not be the take-up reel and one arrangement is shown in which the supply reel is utilized for providing the desired control of the tape transport.

Particular arrangements in accordance with the invention may utilize a tachometer driven by the tape in accordance with its speed and a tape pack sensor to develop respective electrical signals indicative of tape speed and tape pack diameter (or radius) on the drive reel for application to a motor speed control circuit mechanically coupled to the drive reel. In accordance with the invention such arrangements may utilize particular structural configurations to maintain the tape loop between the supply and take-up reels in substantially constant tension. In one such arrangement, a spring-loaded swing arm is employed. This may be used in conjunction with a dash pot connected to the swing arm in order to damp the angular motions of the swing arm resulting from acceleration and deceleration of the tape.

Another particular arrangement may employ a vacuum chamber in place of the swing arm in order to maintain constant tension on the tape in the loop between the supply and take-up reels. Such tension control arrangements also serve as a tape buffer between the two reels. The latter arrangement may be utilized as part of an automatic threading arrangement in accordance with the invention wherein the take-up reel is mounted in a substantially vertical line below the supply reel with various guides being arranged to direct the tape as it drops from the supply reel under the influence of gravity through the desired transport path and onto the take-up reel. In this arrangement, the take-up or fixed reel is advantageously provided with apertures coupled to a vacuum source and arranged to pull the loose end of the tape in against and around the hub of the fixed or take-up reel to complete the automatic threading process. A mechanical swing arm may also be employed for tensioning, but the vacuum type is more preferable in this arrangement because of the fact that a vacuum source is already required to effectuate the automatic pick up on the fixed reel. An adaptation of this arrangement provides an automatic threading operation in a capstan driven tape transport.

In accordance with one particular aspect of the invention, compensation for variation in pack diameter and mass on the fixed reel is accomplished by applying a suitable bias torque current to the fixed reel motor. In one particular arrangement in accordance with the invention, the pack radius sensing element comprises a small chamber through which the tape passes in a line toward the take-up reel. A lamp and at least one light cell are employed to detect the prevailing pack diameter. A second light cell exposed to the same light source as the first-mentioned cell may be included as a reference and for compensation for temperature variation and the like.

In particular arrangements in accordance with the invention, the reel drive motor is controlled in a closed loop feedback circuit. Particular response characteristics are built into the circuit in order to provide the desired substantially constant running speeds and start-stop times and distances irrespective of variations in the fixed reel tape pack. Different circuitry may be employed in accordance with the invention depending upon the range of start-stop times desired, each of which provides substantially constant control of such start-stop times over the extent of the tape being processed and regardless of whether the drive reel is full or empty. Where short start-stop times are desired, i.e., such times on the order of 20 milliseconds, a second order servo including an integrator is employed, such that the difference in start times between full and empty reels is approximately 1.5 percent for an 8½ inch diameter reel. With this servo system, the start distance is within ±0.7 percent of the nominal value because of differences of inertia between an empty reel and a full reel. For relatively long start-stop times, i.e., more than 200 milliseconds, the tape velocity as detected by the tape driven tachometer is servoed against a ramp function during the start and stop intervals. This permits further improvement with respect to the differences in times between empty and full reels. Results thus obtained compare favorably with the precise start-stop times and distances achieved by the more expensive and more complex capstan-drive digital tape transports of the prior art.

BRIEF DESCRIPTION OF THE DRAWINGS

A better understanding of the invention may be had from a consideration of the following detailed description, taken in conjunction with the accompanying drawings, in which.

DESCRIPTION OF THE PREFERRED EMBODIMENTS

Figure 1:
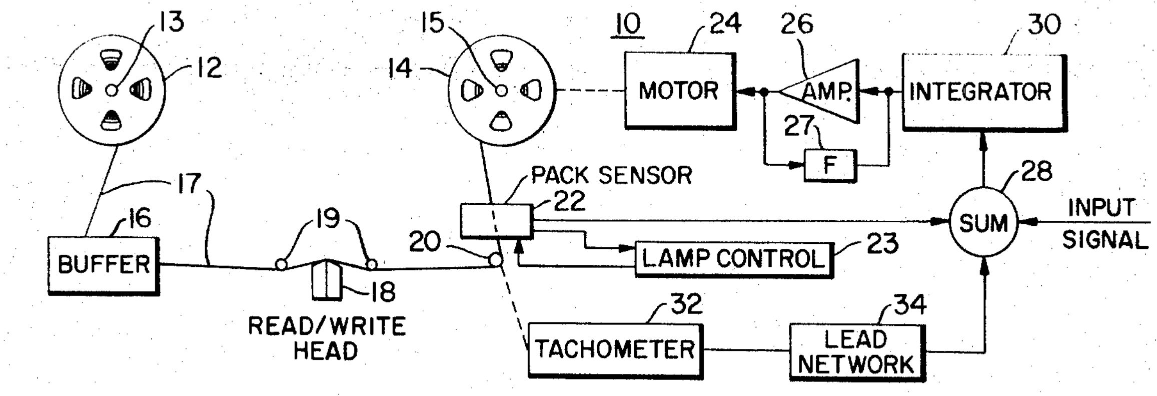
FIG. 1 is a block diagram of one particular arrangement in accordance with the invention.

One particular arrangement of a reel-to-reel drive transport system 10 in accordance with the invention as shown in FIG. 1 comprises a supply reel 12 mounted on a hub 13 and a drive or take-up reel 14 mounted on a hub 15 between which the magnetic tape 17 extends along a tape path including a buffer 16, the read/write head 18, various rollers 19 and 20, and a pack sensor 22 coupled to a lamp control stage 23. The drive reel 14 is driven by a motor 24 controlled by a power amplifier 26 with feedback loop 27 which receives control signals from a summing stage 28 by way of an integrator stage 30. The roller 20 is mechanically coupled to drive a tachometer 32 which develops an electrical signal for application to the summing stage 28 via a lead network 34. The summing stage 28 also receives electrical signals from the pack sensor 22 and from the input to the motor control circuit. The supply reel 12 may be coupled to a conventional rewind motor (not shown) for rewinding the tape 17 after it has been driven through the tape transport.

Figure 2:
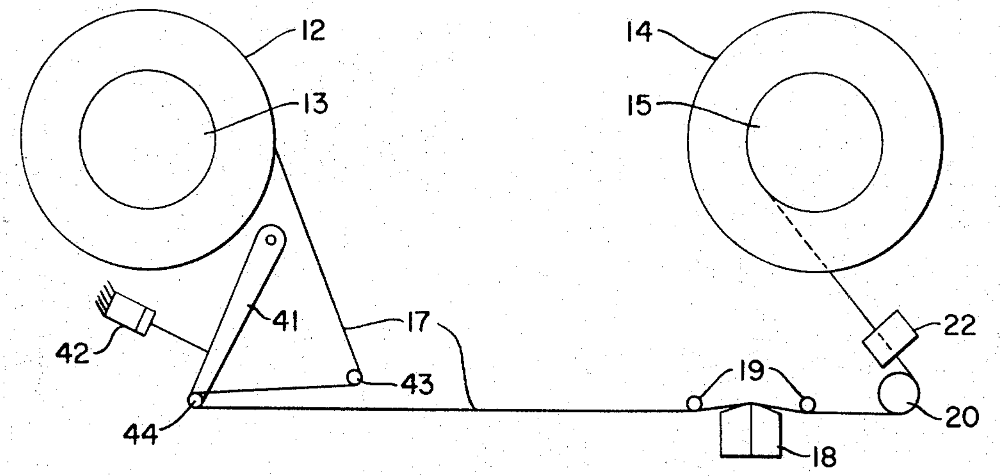
FIG. 2 is a diagram showing one particular structural configuration which may be employed in the arrangement of FIG. 1.

FIG. 2 shows one particular tape transport configuration which may be utilized in the arrangement of FIG. 1. In this configuration, the buffer 16 of FIG. 1 is shown comprising a mechanical arrangement including a swing arm 41 and a damping element 42 coupled thereto. The tape path is directed via tape guides 43 and 44 to the movable end of the swing arm 41. Thus, during start-stop control of the tape 17 between the reels 12 and 14, the swing arm 41 moves in accordance with the tape tension forces applicable thereto and the restraint imposed by the dash pot 42 to control the tape tension and to adjust the tape length by variation of the buffer segment extending over the guide 44.

Figure 3:
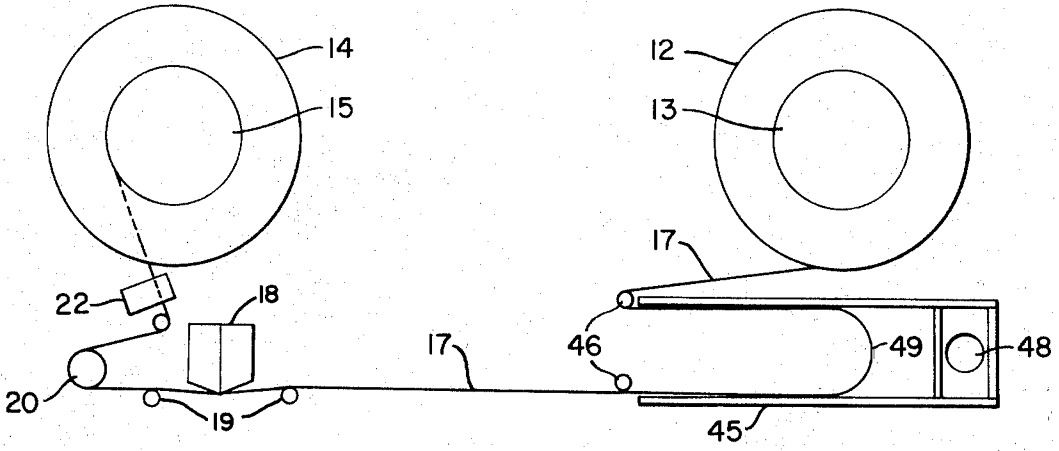
FIG. 3 is a diagram of another particular structural configuration which may be employed in the arrangement of FIG. 1.

In FIG. 3, an alternative arrangement to that shown in FIG. 2 is represented in which a vacuum chamber 45 is substituted for a mechanical buffer of FIG. 2. As shown in FIG. 3, the tape 17 from the supply reel 12 is fed into the vacuum chamber 45 by way of guide rollers 46 and thence along the path including the read/write head 18 and the tachometer pulley 20. The vacuum chamber 45 is of conventional design and has an aperture 48 adjacent its inner end for communication with a vacuum source (not shown). In this arrangement, a tape loop 49 is maintained within the vacuum chamber 45, subject to variations in its extent to accommodate the varying tension forces of the tape imposed during the start-stop operation.

Figures 4, 5, 6, 7:
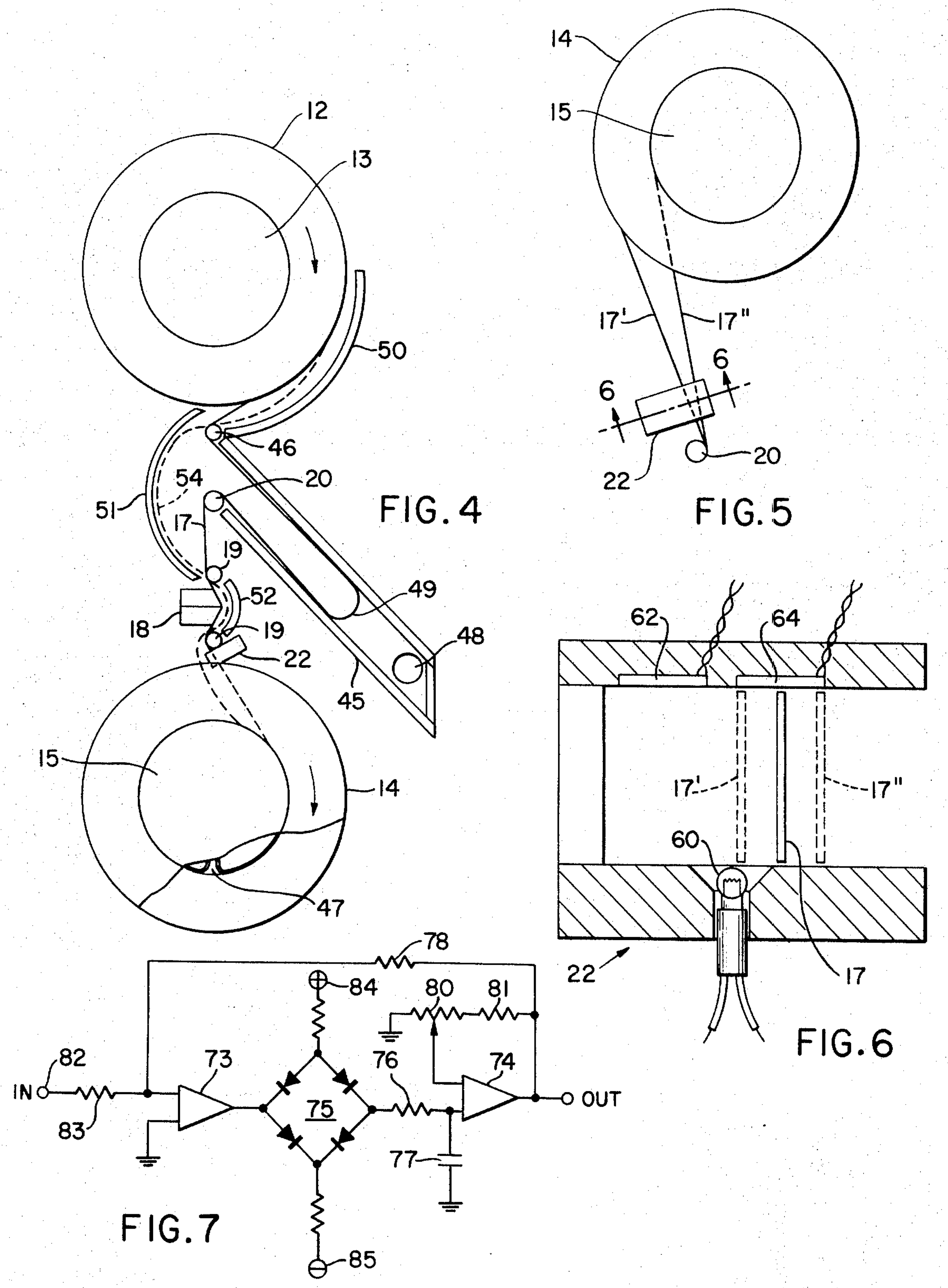
FIG. 4 shows a variation of the configuration of FIG. 3 adapted to provide an automatic threading feature.
FIG. 5 is a diagram illustrating the operation of a particular element of the arrangement of FIG. 1.
FIG. 6 is a sectional view taken along the line 6—6 of FIG. 5.
FIG. 7 is a schematic diagram of a signal shaping circuit which may be employed in conjunction with the arrangement of FIG. 1 in one particular arrangement in accordance with the invention.

FIG. 4 is a plan view, partially broken away, showing a particular transport configuration in accordance with the invention which is preferred for use in mounting arrangements which admit of a generally vertical disposition of the tape path between the supply and drive reels 12 and 14 respectively. As in the arrangement of FIG. 3, a vacuum chamber 45 is provided as a tape buffer. The tape path is established over the tachometer pulley 20 and various tape guides 19 and 46 in conjunction with the read/write head 18. In addition, a plurality of tape threading guides 50, 51 and 52 are placed in suitable positions to direct the tape 17 along the desired path from the supply reel 12 to the take-up reel 14. The reel 14 is provided with a number of apertures substantially equally spaced about its hub 15, such as 47, and communicating via passages with the vacuum source coupled to the aperture 48 of the vacuum chamber 45.

The entire arrangement is mounted in a vertical plane as shown, and the mechanism relies on the force of gravity in automatic threading of the tape 17 through the transport path from the supply reel 12 to the take-up reel 14. In the operation of this arrangement, the supply reel 12 is fixed to the supply reel hub and the loose end of the tape 17 is made to rest on the first tape threading guide 50. A clockwise bias torque is applied to the reels 12 and 14. Rotation of the supply reel 12 feeds the tape end along a path as shown by the broken line 54. This path extends along the tape threading guide 50, over the tape guide roller 46, along the tape threading guide 51, past the two tape guide rollers 19 and between the read/write head 18 and the tape threading guide 52 into the drive reel 14. Rotation of the drive reel 14 picks up the loose tape end by means of the vacuum orifices around the circumference of the take-up reel hub. The drive reel 14 then stops and vacuum is applied to the vacuum chamber 45, drawing the tape into the path shown by the solid line. The supply reel 12 continues to rotate until the correct amount of tape is present as a loop 49 in the vacuum column 45, after which the transport is ready for operation in normal mode.

Operation of the pack sensor 22 of FIGS. 1–4 may be understood by reference to FIGS. 5 and 6, of which FIG. 6 is a section taken along the line 6—6 of FIG. 5, looking in the direction of the arrows. As shown in FIG. 6, the sensor 22 comprises a chamber open on one end to receive the tape 17 which is guided into and moves through the sensor 22. The sensor 22 contains a lamp 60 positioned opposite a pair of light responsive cells 62 and 64, each being provided with suitable leads for electrical connection to external circuitry. The tape 17 is shown in FIG. 6 in a first position, together with a pair of alternate positions 17' and 17'' indicated in broken outline.

Referring to FIG. 5, the tape is initially in the position indicated by the numeral 17'' as the drive reel 14 begins to wind the tape thereon. Thus, the tape 17 extends between the pulley 20 and the reel 14 along a path directed at a particular angle thereto and it occupies a particular position, for example 17'' within the sensor 22 as shown in FIG. 6. When substantially all of the tape from the supply reel 12 is transferred to the drive reel 14, the tape 17 follows a path such as 17' between the pulley 20 and the reel 14, and occupies a position such as 17' within the pack sensor 22 of FIG. 6. As the tape moves from the position 17'' to the position 17' within the pack sensor 22, it obscures an increasing proportion of the light from the lamp 60, thus reducing the amplitude of the output signal derived from the light cell 64. This output signal is utilized in the transport drive circuitry shown in FIG. 1 as an indication of the effective lever arm, namely radius of the pack on the drive reel 14, thus permitting compensation for variation both in the inertia of the drive reel 14 with the tape loaded thereon and in the effective lever arm corresponding to the radius of the outside of the tape pack on the reel 14. The light cell 62 is illuminated by the lamp 60 under all conditions, and is employed to develop a reference signal used in the lamp control stage 23 of FIG. 1 to maintain a uniform output from the lamp 60.

As shown in FIG. 1, the motor control circuitry includes a power amplifier 26 having a feedback 27 and a tachometer 32 in series with a lead network 34. With such a combination, the motor servo system has zero position error with a velocity error that is given by the inner loop amplification. In order to control the acceleration error, a lag network comprising a resistor and capacitor is inserted parallel to the feedback network 27. This network forms an integrator in combination with the amplifier 26. With such a system, the measured difference for the start times between full and empty drive reel 14 is not in excess of 1.5 percent for an 8½ inch diameter reel.

The transfer function of the closed loop may be represented as follows:

$$C/R = K_A \cdot K_M \cdot (s\tau_3+1)/s^2 \cdot (s\tau_1+1) \cdot (s\tau_2+1)\cdot(s\tau_3+1) + K_A \cdot K_M \cdot K_T \qquad (1)$$

where $C$ represents the output shaft movement of the drive motor, $R$ is the input command, $K_A$ the amplification factor of the amplifier, $K_M$ the inverted value of the motor back emf, $K_T$ the tachometer back emf, $\tau_1$ is the motor mechanical time constant, $\tau_2$ is the time constant of the amplifier lag network, and $\tau_3$ is the time constant of the lead network in the tachometer leg.

For such a system, the acceleration error is as follows:

$$R = \alpha / K_A \cdot K_M \cdot K_T \qquad (2)$$

where $\alpha$ is the angular acceleration of the output shaft of the drive motor.

The practical value of the product $K_A \cdot K_M \cdot K_T$ should be less than five in order to maintain the system stable. With such a response as indicated in equation (1), the difference in the start distances between empty and full take-up reels 14 is limited to ±0.7 percent. In such a system comprising reel-to-reel-drive transport, both the short term and the long term variations in response compare favorably with those of the presently utilized single capstan drive mechanisms.

In those applications of reel-to-reel-drive transports in accordance with the invention where fast start-stop times and short start-stop distances are not a requirement, certain simplifications of the motor drive circuit as shown in FIG. 1 may be realized. In such an arrangement, a ramp signal is utilized as the input signal to the summing stage 28 and both the feedback network 27 and the lead network 34 are purely resistive. Use of the ramp input instead of a step input permits further improvement in the differene in operation between empty and full reels. In one particular application, a ramp of 260 milliseconds is employed. With this fixed time interval representing the major portion of the total time for the tape transport to come up to speed, the variation in response between empty and full take-up reels now becomes an insignificant portion of the total start-time variation.

One particular circuit arrangement for generating the ramp input signal is shown in FIG. 7, which may comprise the input portion of the summing stage 28 of FIG. 1. This comprises a pair of integrated circuit amplifiers 73 and 74, a rectifier bridge 75 connected between opposite polarity voltage sources 84 and 85, and a precision resistor 76 and capacitor 77 connected between the two amplifiers 73 and 74. A feedback resistor 78 is connected from the output of the amplifier 74 to the input of the amplifier 73, and a second feedback network comprising resistors 80 and 81 is connected across the amplifier 74. The input signal applied at an input terminal 82 is a square wave voltage of precise amplitude. This signal saturates the input amplifier 73 because its output cannot follow instantaneously and consequently the current into the input resistor 83 cannot be compensated from the output through the feedback resistor 78. Depending on the polarity of the input signal, the precision capacitor 77 is charged from one or the other of the standardized voltage sources 84, 85 connected across the rectifier 75. Both of these voltage sources are equal but opposite in polarity and less than the saturation voltage of the input amplifier 73.

Assuming for purpose of illustration that the input signal is positive, the output of the amplifier 73 is driven negative. This influences the bridge rectifier 75 to pass current from the positive voltage terminal 84 into the saturated output of the amplifier 73. The precision capacitor 77 is thus charged negatively from the minus voltage terminal 85 through the rectifier 75 and the precision resistor 76. The output amplifier 74 is connected as a voltage follower in a non-inverting input configuration. The amplifier 74 presents a very high input impedance and its gain can be adjusted from approximately two to 10. Since the initial 30 percent of a capacitor charging curve is linear within 1 percent, the output of the amplifier 74 is a linear ramp which rises to the point where all of the current in the input resistor 83 is compensated by the current from the feedback resistor 78. When this point is reached, the input amplifier 73 goes out of saturation, establishing a balance such that enough current flows into the capacitor 77 to cover the losses and hold the capacitor 77 at a constant voltage. Thus, the output voltage of the amplifier 74 is held constant thereafter.

When the input signal is removed, the input amplifier 73 swings into saturation in the other direction, permitting the capacitor 77 to discharge to the opposite polarity of the voltage source. When the voltage on the capacitor 77, and consequently at the output of the amplifier 74, approaches zero, the input amplifier 73 goes out of saturation and re-establishes the balance in the circuit. In this way, the on and off ramps are linear and uniform at a stable constant voltage level between the ramps. The rise and fall times for all directions and polarities are uniform, but may be adjusted by changing the setting of the potentiometer 80 in the feedback path of the output amplifier 74.

Figure 8:
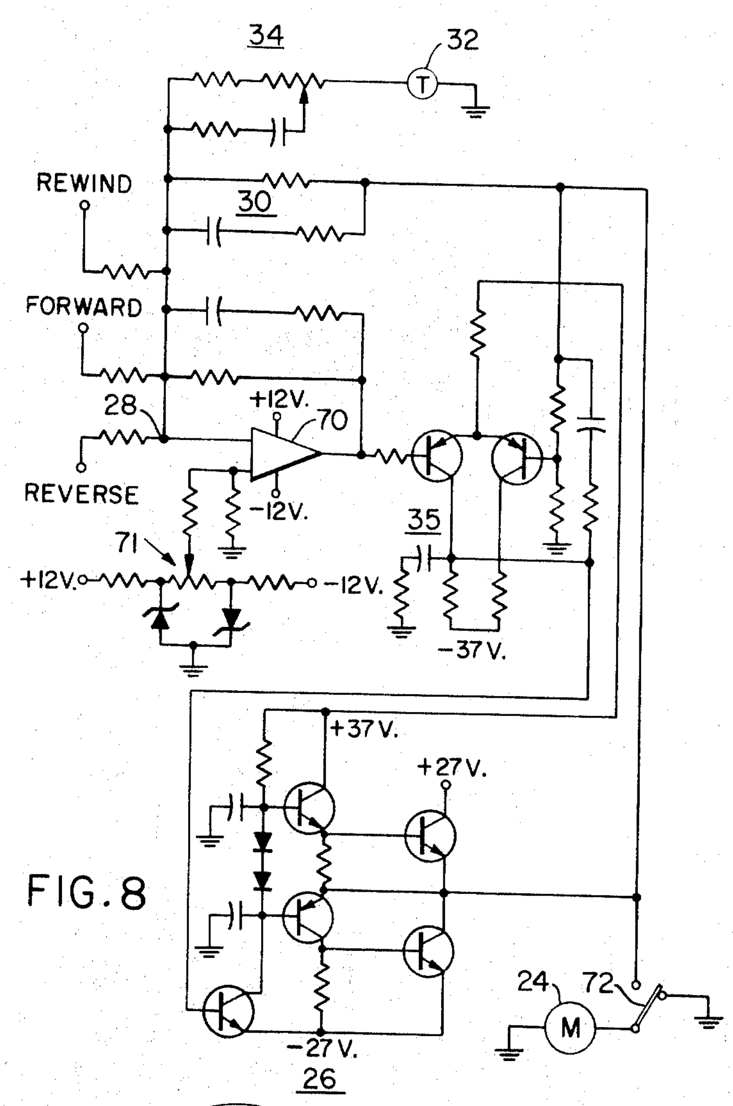
FIG. 8 is a schematic diagram of a particular circuit which may be employed in the arrangement shown in FIG. 1.

FIG. 8 represents in schematic form one particular circuit configuration which may be employed in the control portion of the arrangement of FIG. 1. Beginning with the summing stage 28, an operational amplifier 70 is shown connected to receive various input signals such as "Rewind", "Forward" or "Reverse", together with the feedback signal developed by the tachometer 32 coupled via a lead network 34 and voltage feedback from the integrator network 30. (The pack sensor signal has been omitted from this circuit for simplicity.) The reference input to the operational amplifier stage 70 is connected through a "zero adjust" network 71 coupled between a reference potential and the opposite polarity terminals of a 12-volt power supply. The output of the amplifier 70 is connected to the base of one of a pair of transistors interconnected in a differential amplifier configuration, the output of the variable transistor in the differential amplifier stage being connected to the integrator 35 and to the input of the motor drive amplifier stage 26. The amplifier stage 26 comprises an input transistor connected to drive a pair of direct coupled transistor stages arranged to apply a voltage between plus and minus 27 volts to drive the motor 24. A switch 72, preferably actuated by a "ready" relay (not shown) is provided to connect the motor 24 to either the output of the amplifier stage 26 or to ground.

Figure 9:
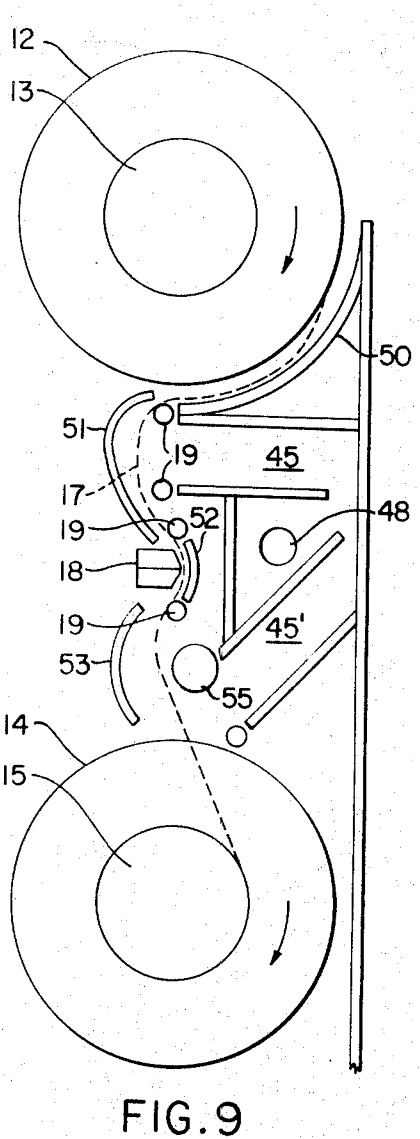
FIG. 9 shows an arrangement similar to that of FIG. 4 but adapted for use with a single capstan tape transport.

FIG. 9 is a diagrammatic view similar to the arrangement of FIG. 4, but illustrating a self-threading arrangement in accordance with the invention for utilization in a single capstan drive configuration. Corresponding elements have been given corresponding reference numerals in FIG. 9. The tachometer 20 is dispensed with, as is the pack sensor 22, an additional vacuum chamber 45' having been added along with the single capstan 55 as is customary in capstan driven tape transports. An additional tape threading guide, designated 53, is provided to complete the arrangement. Operation of the arrangement of FIG. 9 is similar to that described in connection with FIG. 4, the tape threading guides 50, 51, 52 and 53 serving to guide the free end of the tape on its downward traverse from the supply reel 12 to the take-up reel 14 during the threading operation. The reel 14 and hub 15 are provided with a vacuum passage arrangement as described in connection with FIG. 4 to complete the threading of the free end of the tape 17 on the reel 14.

Figure 10:
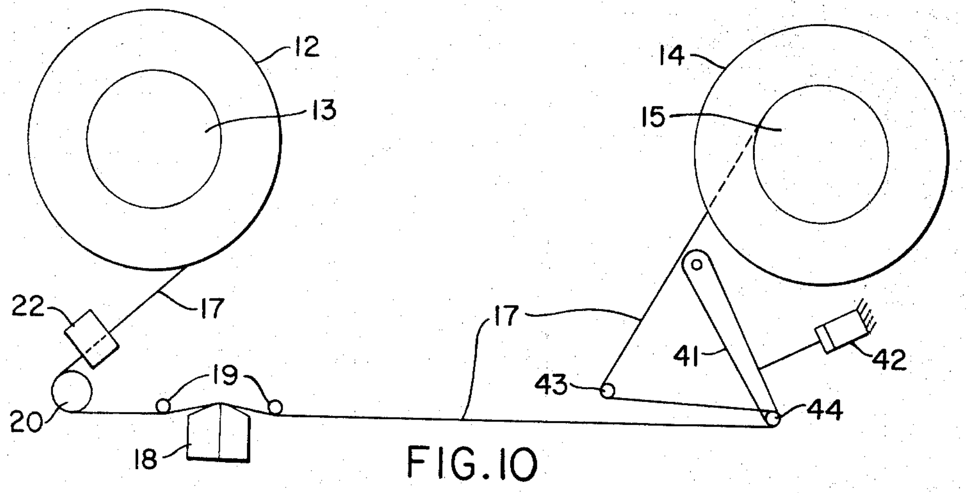
FIG. 10 shows an arrangement in accordance with the invention which may be used as an alternative to the tape transport of FIG. 2 for example.

FIG. 10 shows a configuration in accordance with the invention in which the control portion of the system is coupled to the supply reel instead of the take-up reel. FIG. 10 represents an adaptation of FIG. 2 for this purpose. Although like reference numerals are employed, it will be understood that in FIG. 10 the supply reel 12 mounted on the hub 13 is controlled by the motor 24 which is responsive to drive signals developed by the circuit portion of FIG. 1. In the operation of this configuration, the take-up reel 14 on the hub 15 is driven by a separate motor (not shown) which is energized to develop a bias torque which pulls the tape 17 through the tape transport under the control of the motor and control system coupled to the hub 13 of the supply reel 12. In other respects, the operation of the system is essentially identical to that shown and described in connection with FIGS. 1 and 2.

Thus, particular arrangements in accordance with the invention as disclosed hereinabove advantageously provide reel-to-reel-drive tape transport mechanisms with associated control arrangements which are simpler, more reliable and less costly than mechanisms presently available which utilize a drive capstan. For example, such systems in accordance with the invention eliminate the need for the capstans and pinch rollers in the case of dual pinch roller drive transports, save the capstan and drive motor in the case of a single capstan drive, plus the associated servo electronics, as well as eliminating the need for one tape buffer storage element, either the mechanical arm or the vacuum chamber type. Such reel-to-reel-drive transports are effective at lower tape speeds (for example up to approximately 18¾ inches per second) and for the smaller type reels (up to approximately 8½ inches in diameter). Thus, for applications of tape transports operating in these ranges, reel-to-reel-drives in accordance with the principles of the present invention are preferable to the capstan-driven mechanisms presently available. A specific self-threading arrangement is disclosed as applicable to tape transport mechanisms of both types.

Although there have been described hereinabove specific arrangements of tape transport apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A reel driven tape transport system comprising:
- a first hub for receiving a take-up reel on which tape is to be wound;
- a second hub for receiving a reel carrying a supply of tape to be transferred to the take-up reel;
- means for guiding the tape along a predetermined path including a transducer head adjacent the tape between reels positioned on the two hubs;
- drive means coupled to control tape speed at the head by controlling the rotation of one of said hubs;
- control means for controlling said drive means to maintain both the speed of the tape at the head and the start-stop times of the system substantially invariable irrespective of variations in the amount of tape contained on either of the reels within the ranges of normal storage capacity of said reels; and
- sensing means coupled to the control means for detecting the extent to which the reel coupled to the drive means is filled with tape.

2. A system in accordance with claim 1 further including means for sensing tape velocity along said tape path and controlling the drive means accordingly.

3. A system in accordance with claim 2 wherein the velocity sensing means comprises a tachometer coupled to the tape path to be driven by the tape and developing an electrical signal having an amplitude indicative of tape velocity.

4. A system in accordance with claim 1 further including means connected to the control means for receiving an externally applied control signal.

5. A system in accordance with claim 1 wherein said sensing means comprises a chamber encompassing a portion of said tape path adjacent one of said reels, a light source positioned on one side of said chamber, and light responsive means opposite the light source in a position such that the light path thereto is blocked by the tape in varying degree in accordance with the amount of tape on said one reel.

6. A system in accordance with claim 5 further including a second light responsive means having a response characteristic substantially identical to the first-mentioned light responsive means and positioned opposite the light source and adjacent the first-mentioned light responsive means for developing a reference signal to regulate the light source.

7. A system in accordance with claim 1 further including combining means for receiving a control signal, a signal indicative of tape speed, and a signal indicative of the amount of tape on the reel coupled to the drive means for applying a compositive of said signals to the control means.

8. A system in accordance with claim 1 further including a tape buffer as part of said tape path.

9. A system in accordance with claim 8 wherein said tape buffer comprises a swing arm pivoted at one end and having a tape guide about which the tape is looped in said tape path positioned at the opposite end for rotation about the pivoted end.

10. A system in accordance with claim 9 further including restraining means connected to the swing arm for opposing the free rotation of the swing arm and thereby applying a predetermined tension to the tape.

11. A system in accordance with claim 8 wherein the tape buffer comprises a vacuum chamber and means for drawing a tape loop into said chamber.

12. A system in accordance with claim 11 further including at least one vacuum aperture about said first hub for automatically attracting a free end of the tape to said hub.

13. A system in accordance with claim 12 wherein said hubs are placed in substantially vertical coplanar alignment, the first hub being below the second hub, and further including means for automatically directing the tape to assume a predetermined tape path between the reel on the second hub and the reel on the first hub.

14. A system in accordance with claim 13 wherein the tape directing means comprises a plurality of tape threading guides positioned respectively adjacent the supply reel, adjacent the take-up reel, and intermediate the first and second hubs to direct the tape along a first predetermined path such that when the free end of the tape is attracted by the vacuum aperture of the first hub it is shifted by the vacuum chamber to a second predetermined path in operative engagement with the control means.

15. A reel drive tape transport system comprising:
- a first hub for receiving a take-up reel on which tape is to be wound;
- a second hub for receiving a reel carrying a supply of tape to be transferred to the take-up reel;
- means for guiding the tape along a predetermined path including a transducer head adjacent the tape between reels positioned on the two hubs;
- drive means coupled to control tape speed at the head by controlling the rotation of one of said hubs; and
- means including reel pack sensing means coupled to the tape path for controlling the drive means to maintain the start-stop characteristics of the drive means substantially invariable over the range of normal capacity of the tape on said reels.

16. A reel-driven tape transport system comprising:
- first and second hubs for receiving tape reels between which a supply of tape is to be transported along an operational path including a transducer head;
- signal responsive means coupled to control tape speed at the head by driving one of said hubs;
- an analog voltage generator positioned for coupling to the tape path to develop a voltage which corresponds to tape speed at the head;
- electrical circuitry coupled to the output of the generator and having a terminal to which an input command signal may be applied for developing a control signal to control the signal responsive means; and
- a pack sensor adapted to sense both the diameter and inertia of the tape pack on the driven reel and coupled to provide a signal to the input of said circuitry in order to maintain the operating characteristics of the tape transport substantially constant between the empty and full conditions of the driven reel.

17. A tape transport system in accordance with claim 16 wherein said circuitry further includes:

a lead network connected to the output of the voltage generator in order to maintain the speed of the tape substantially constant in accordance with the level of the input command signal.

18. A tape transport system in accordance with claim 16 further including:

an integrator and a feedback power amplifier connected at the input to the drive means to control the start-stop times and distances of the drive means within predetermined limits.

19. A tape transport system in accordance with claim 18 wherein said circuitry provides a closed loop transfer function according to the following equation:

$$C/R = K_A \cdot K_M \cdot (s\tau_3 + 1)/s^2 \cdot (s\tau_1 + 1) \cdot (s\tau_2 + 1) \cdot (s\tau_3 + 1) + K_A \cdot K_M \cdot K_T$$

where $C$ represents the output shaft movement of the drive motor, $R$ is the input command, $K_A$ is the amplification factor of the power amplifier, $K_M$ is the inverted value of the motor back emf, $K_T$ is the tachometer back emf, $\tau_1$ is the motor mechanical time constant, $\tau_2$ is the time constant of the feedback network of the power amplifier, and $\tau_3$ is the time constant of the lead network in the voltage generator leg.

20. A tape transport system in accordance with claim 16 further including a ramp generating stage coupled to apply a ramp control signal to the input terminal of said circuitry.

21. A tape transport system in accordance with claim

20 wherein the ramp generating stage comprises:

first and second stabilized amplifier stages connected on opposite sides of a bridge rectifier and coupled together by a resistive feedback path from the output of the second stage to the input of the first stage, the output of the second stage being coupled to the input terminal of said circuitry to apply a ramp input thereto in response to a step command signal applied to the input of said first amplifier stage; and a capacitor connected in parallel to the reference terminal of the second stage so as to develop a substantially linearly changing output of the second stage over the operational range of the first stage.

22. A tape transport system in accordance with claim 16 configured such that the hubs and corresponding reels are juxtaposed in substantially vertical alignment in operating position, and further including:

a series of tape threading guides positioned with respect to the two hubs and each other so as to direct a free end of the tape from the supply reel to the take-up reel under the influence of gravity.

23. A tape transport system in accordance with claim 22 further including vacuum means cooperating with the take-up reel to attract the free end of the tape for engaging the take-up reel.

24. A tape transport system in accordance with claim 22 wherein said tape threading guides comprise arcuate elements positioned in sequence on opposite sides of said tape path, each one having its concave side facing the tape path.

* * * * *